(12) United States Patent
Ye

(10) Patent No.: US 12,560,768 B2
(45) Date of Patent: Feb. 24, 2026

(54) ADAPTOR AND METHOD FOR MATING A FIBER OPTIC CONNECTOR

(71) Applicant: AFL Telecommunications LLC, Duncan, SC (US)

(72) Inventor: Zidi Ye, Shenzhen (CN)

(73) Assignee: AFL Telecommunications LLC, Duncan, SC (US)

( * ) Notice: Subject to any disclaimer, the term of this patent is extended or adjusted under 35 U.S.C. 154(b) by 341 days.

(21) Appl. No.: 18/022,643

(22) PCT Filed: Aug. 24, 2021

(86) PCT No.: PCT/US2021/047226
§ 371 (c)(1),
(2) Date: Feb. 22, 2023

(87) PCT Pub. No.: WO2022/046680
PCT Pub. Date: Mar. 3, 2022

(65) Prior Publication Data
US 2023/0324628 A1 Oct. 12, 2023

Related U.S. Application Data

(60) Provisional application No. 63/070,558, filed on Aug. 26, 2020.

(51) Int. Cl.
*G02B 6/38* (2006.01)

(52) U.S. Cl.
CPC ......... *G02B 6/3849* (2013.01); *G02B 6/3825* (2013.01); *G02B 6/3874* (2013.01)

(58) Field of Classification Search
CPC ... G02B 6/3849; G02B 6/3825; G02B 6/3874
(Continued)

(56) References Cited

U.S. PATENT DOCUMENTS

| | | | |
|---|---|---|---|
| 5,363,460 A | 11/1994 | Marazzi et al. | |
| 6,206,577 B1 | 3/2001 | Hall, III et al. | |
| (Continued) | | | |

FOREIGN PATENT DOCUMENTS

| | | | | |
|---|---|---|---|---|
| EP | 3627199 A1 | 3/2020 | | |
| GB | 2506890 A | * 4/2014 | .......... | G02B 6/3825 |
| WO | WO2014057265 A2 | 4/2014 | | |

OTHER PUBLICATIONS

PCT International Search Report & Written Opinion Corresponding to PCT/US2021/047226 on Dec. 20, 2021.

*Primary Examiner* — Jerry M Blevins
(74) *Attorney, Agent, or Firm* — Dority & Manning, P.A.

(57) ABSTRACT

An adaptor and a method for mating a fiber optic connector to an adaptor are provided. The adaptor includes a retaining clip including a slideable surface. A shutter spring is positioned along the slideable surface. A shutter is pivotally connected to the retaining clip from a first angle prior to insertion of the connector into the adaptor to a second angle after receiving the connector. A main body forms an opening through which the retaining clip is received. The connector is insertable through an opening formed by a bushing and a sleeve. The method includes sliding the shutter spring into the retaining clip, connecting the shutter to the shutter spring, biasing the shutter in a forward direction via the shutter spring held in a non-orthogonal angle prior to insertion of the connector, and inserting the retaining clip including the shutter and the shutter spring into the main body.

16 Claims, 10 Drawing Sheets

(58) Field of Classification Search
USPC .......................................................... 385/139
See application file for complete search history.

(56) References Cited

U.S. PATENT DOCUMENTS

| | | | |
|---|---|---|---|
| 6,425,694 B1 | 7/2002 | Szilagyi et al. | |
| 6,471,412 B1 | 10/2002 | Belenkiy et al. | |
| 6,481,902 B2 | 11/2002 | Takaoka et al. | |
| 6,511,229 B2 | 1/2003 | Kiani | |
| 6,595,696 B1 | 7/2003 | Zellak | |
| 6,685,362 B2 | 2/2004 | Burkholder et al. | |
| 6,688,780 B2 | 2/2004 | Duran | |
| 6,702,477 B1 | 3/2004 | Ngo | |
| 6,715,930 B2 | 4/2004 | McBride | |
| 6,764,222 B1 | 7/2004 | Szilagyi et al. | |
| 6,796,719 B2 | 9/2004 | Zhu et al. | |
| 6,869,297 B2 | 3/2005 | Caveney | |
| 7,118,284 B2 | 10/2006 | Nakajima et al. | |
| 7,144,163 B2 | 12/2006 | Tanaka et al. | |
| 7,318,751 B2 | 1/2008 | Erdman et al. | |
| 7,413,351 B2 | 8/2008 | Ozawa et al. | |
| 7,648,286 B2 | 1/2010 | Nakagawa | |
| 7,661,887 B2 | 2/2010 | Nakagawa | |
| 7,665,901 B2 | 2/2010 | Kewitsch | |
| 7,676,133 B2 | 3/2010 | Lampert et al. | |
| 7,785,018 B2 | 8/2010 | Jones et al. | |
| 7,837,395 B2 | 11/2010 | Lin et al. | |
| 7,841,777 B2 | 11/2010 | Howard et al. | |
| 7,972,066 B1 | 7/2011 | Lin et al. | |
| 7,985,027 B2 | 7/2011 | Lewallen et al. | |
| 8,121,457 B2 | 2/2012 | Zimmel | |
| 8,267,595 B2 | 9/2012 | Lin et al. | |
| 8,348,517 B2 | 1/2013 | Mudd et al. | |
| 8,369,677 B2 | 2/2013 | Allen | |
| 8,491,198 B2 | 7/2013 | Lin | |
| 8,628,254 B2 | 1/2014 | Lin et al. | |
| 8,632,258 B2 | 1/2014 | Jibiki et al. | |
| 8,708,574 B2 | 4/2014 | Wang et al. | |
| 8,770,856 B2 | 7/2014 | Lin et al. | |
| 8,821,031 B2 | 9/2014 | Lin et al. | |
| 8,882,519 B2 | 11/2014 | White | |
| 8,926,193 B2 | 1/2015 | Kim | |
| 8,936,400 B2 | 1/2015 | Jibiki et al. | |
| 9,022,668 B2 | 5/2015 | Ishiguro | |
| 9,128,255 B2 | 9/2015 | Sato | |
| 9,146,363 B2 | 9/2015 | Lin et al. | |
| 9,188,747 B2 | 11/2015 | Gniadek | |
| 9,196,997 B2 | 11/2015 | Sanders et al. | |
| 9,297,962 B2 | 3/2016 | Lee | |
| 9,366,827 B2 | 6/2016 | Taira et al. | |
| 9,453,963 B2 | 9/2016 | Sato | |
| 9,581,767 B2 | 2/2017 | Leigh et al. | |
| 9,632,256 B2 | 4/2017 | Yang et al. | |
| 9,798,092 B2 | 10/2017 | Leigh et al. | |
| 9,869,824 B2 | 1/2018 | Sakai et al. | |
| 9,874,702 B2 | 1/2018 | Megason et al. | |
| 9,933,586 B1 | 4/2018 | Yang | |
| 10,101,539 B2 | 10/2018 | Yang et al. | |
| 10,197,741 B2 | 2/2019 | Nelson | |
| 10,241,288 B2 | 3/2019 | He | |
| 10,295,752 B2 | 5/2019 | Zhu et al. | |
| 10,416,392 B2 | 9/2019 | Hsu et al. | |
| 10,436,988 B2 | 10/2019 | Travis | |
| 10,451,812 B2 | 10/2019 | Verheyden | |
| 10,502,903 B1 | 12/2019 | Wang et al. | |
| 10,545,295 B1 | 1/2020 | Sato | |
| 10,718,911 B2 | 7/2020 | Chang et al. | |
| 10,852,486 B2 | 12/2020 | Hsu et al. | |
| 11,307,360 B2 | 4/2022 | Higley | |
| 11,467,348 B2 | 10/2022 | Verheyden | |
| 2003/0065287 A1* | 4/2003 | Spohn | A61M 5/14566 |
| | | | 604/67 |
| 2004/0179787 A1 | 9/2004 | Glazowski et al. | |
| 2013/0121643 A1* | 5/2013 | Sanders | G02B 6/3849 |
| | | | 385/56 |
| 2014/0147082 A1* | 5/2014 | Lee | G02B 6/3825 |
| | | | 385/78 |
| 2015/0241650 A1 | 8/2015 | Travis | |
| 2016/0324402 A1 | 11/2016 | Yajima | |
| 2020/0003960 A1 | 1/2020 | Hsu et al. | |
| 2020/0012049 A1 | 1/2020 | He | |
| 2020/0132956 A1 | 4/2020 | Watanabe | |
| 2020/0150353 A1 | 5/2020 | Wong et al. | |
| 2020/0174199 A1 | 6/2020 | Wong et al. | |
| 2020/0218015 A1 | 7/2020 | Ho et al. | |
| 2020/0257056 A1 | 8/2020 | Milchtein Peltsverger et al. | |
| 2021/0373249 A1 | 12/2021 | Song et al. | |

* cited by examiner

1000

1010 — CONNECTING THE BUSHING AND THE SLEEVE TO THE MAIN BODY

1020 — SLIDING THE SHUTTER SPRING INTO THE RETAINING CLIP

1030 — CONNECTING THE SHUTTER TO THE SHUTTER SPRING AND BIASING THE SHUTTER IN THE OUTWARD DIRECTION VIA THE SHUTTER SPRING POSITIONED WITHIN THE MAIN BODY

1040 — INSERTING THE RETAINING CLIP INCLUDING THE SHUTTER AND THE SHUTTER SPRING INTO THE MAIN BODY ALONG THE INWARD DIRECTION

1050 — INSERTING THE CONNECTOR INTO THE ADAPTOR

1060 — PIVOTING THE SHUTTER IN THE INWARD DIRECTION AGAINST THE SHUTTER SPRING WHEN INSERTING THE CONNECTOR TO THE ADAPTOR

1070 — FORMING A RECESS WITHIN THE SHUTTER

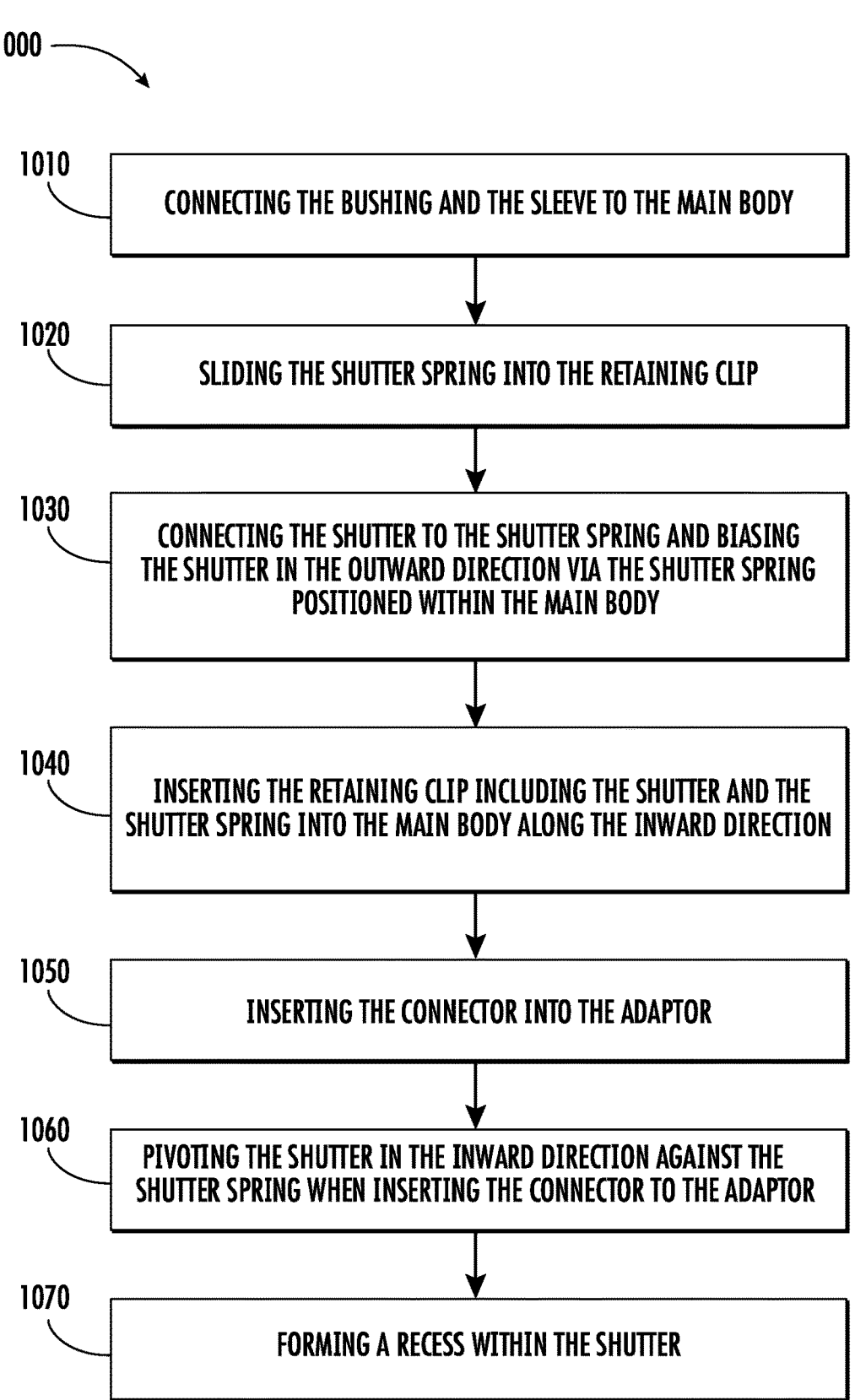

FIG. 10

ADAPTOR AND METHOD FOR MATING A FIBER OPTIC CONNECTOR

PRIORITY STATEMENT

The present application claims priority to provisional application No. 63/070,558 filed on Aug. 26, 2020, and to PCT application PCT/US2021/047226 filed on Aug. 24, 2021, the disclosures of which are incorporated by reference herein in its entirety.

FIELD

The present disclosure relates generally to adaptors for fiber optic connectors, and structures and methods for mating a connector to an adaptor.

BACKGROUND

Known adaptors for fiber optic connectors require certain assembly steps, and in some cases require the utilization of dust caps. Further, known adaptors and methods for assembly may provide insufficient protection from undesired particulates and insufficient ruggedness and durability. Such insufficiency may be particularly acute for adaptors for rectangular cross-section fiber optic connectors, such as LC connectors.

Accordingly, improved adaptors and methods for mating a fiber optic connector to an adaptor are desired in the art. In particular, adaptors and methods for mating a fiber optic connector to an adaptor that provide improved ruggedness and durability, and provide protection from undesired particulates, would be advantageous.

BRIEF DESCRIPTION

Aspects and advantages of the invention in accordance with the present disclosure will be set forth in part in the following description, or may be obvious from the description, or may be learned through practice of the technology.

An aspect of the present disclosure is directed to an adaptor. An axial direction is defined along which a connector is received into the adaptor. A forward end is defined from which the connector is received into the adaptor. An inward direction is defined along the axial direction toward which the connector is extended into the adaptor. An outward direction is defined opposite of the inward direction along the axial direction. The adaptor includes a retaining clip including a slideable surface extended along the axial direction. A shutter spring is positioned in the retaining clip along the slideable surface. A shutter is pivotally connected to the retaining clip from a first angle prior to insertion of the connector into the adaptor to a second angle after receiving the connector. The first angle is greater than 0 degrees and less than 90 degrees. The adaptor includes a main body forming an opening through which the retaining clip is received and positioned within the main body along the inward direction from the forward end. The adaptor includes a bushing and a sleeve. The bushing and the sleeve form a hole through which the connector is insertable into the adaptor.

Another aspect of the present disclosure is directed to a method for mating a fiber optic connector to an adaptor. The adaptor includes a bushing, a sleeve, a main body, a shutter, a pair of pins, a retaining clip, and a shutter spring. The method includes connecting the bushing and the sleeve to the main body; sliding the shutter spring into the retaining clip; connecting the shutter to the shutter spring and biasing the shutter in the forward direction via the shutter spring positioned within the main body. The shutter spring is held in a non-orthogonal angle prior to insertion of the connector. The method includes inserting the retaining clip including the shutter and the shutter spring into the main body along the inward direction.

These and other features, aspects and advantages of the present invention will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which:

FIG. 10 is a flowchart outlining steps of a method for mating a connector to an adaptor in accordance with aspects of the present disclosure.

Figure 1:
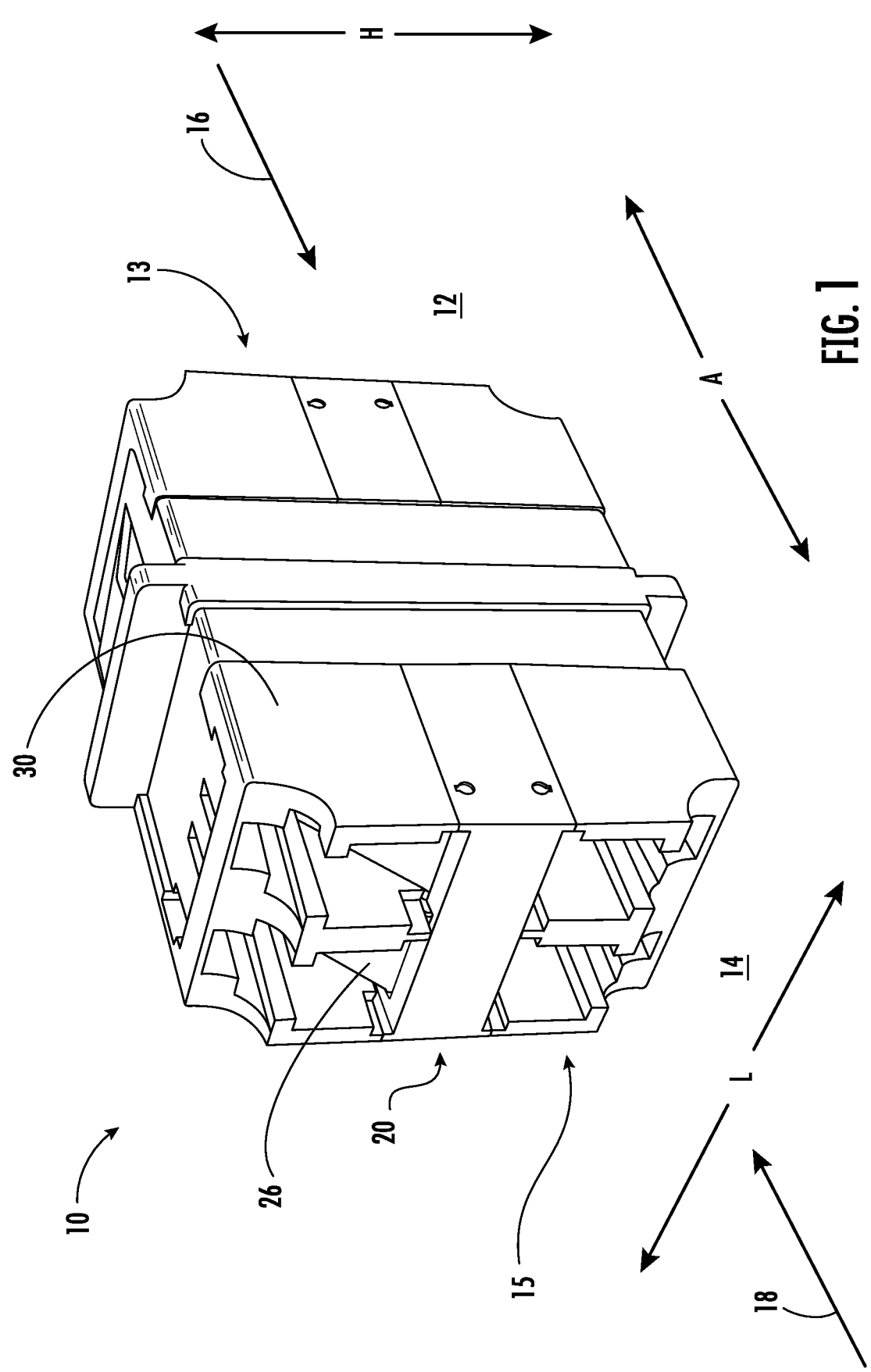
FIG. 1 is a perspective view of an embodiment of an adaptor in accordance with aspects of the present disclosure.

Repeat use of reference characters in the present specification and drawings is intended to represent the same or analogous features or elements of the present invention.

DETAILED DESCRIPTION

Reference now will be made in detail to embodiments of the present invention, one or more examples of which are illustrated in the drawings. The word "exemplary" is used herein to mean "serving as an example, instance, or illustration." Any implementation described herein as "exemplary" is not necessarily to be construed as preferred or advantageous over other implementations. Moreover, each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components. The singular forms "a," "an," and "the" include plural references unless the context clearly dictates otherwise. The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising" "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive- or and not to an exclusive- or. For example, a condition A or B is satisfied by any one of the following: A is true (or present) and B is false (or not present), A is false (or not present) and B is true (or present), and both A and B are true (or present).

Ranges provided herein are inclusive of their end points. For instance, a range of 1 to 100 includes 1 and 100.

Terms of approximation, such as "about," "generally," "approximately," or "substantially," include values within a ten percent full scale error from a lowest value embodiment to a highest value embodiment. For instance, an embodiment including a range from approximately 10 to approximately 100 with a ten percent full scale error may include values from 1 to 109.

Benefits, other advantages, and solutions to problems are described below with regard to specific embodiments. However, the benefits, advantages, solutions to problems, and any feature(s) that may cause any benefit, advantage, or solution to occur or become more pronounced are not to be construed as a critical, required, or essential feature of any or all the claims.

Embodiments of an adaptor and a method for mating a fiber optic connector to an adaptor are provided. Embodiments of the adaptor and method provided herein may provide protection from undesired particulates and improved ruggedness and durability. Embodiments of the adaptor and method depicted and described herein may provide benefits for rectangular cross-section fiber optic connectors, such as LC connectors, ST connectors, SC connectors, MU connectors, MT connectors, MTRJ connectors, or other appropriate type of fiber optic connector. Particular embodiments provided herein may allow for LC connector to other connector adaptors, such as connectors having substantially rectangular cross sections.

Embodiments of the adaptor and methods provided herein include a main body that holds one or more bushings and one or more sleeves defining a hole or connector opening into which a connector may mate, such as a male connector for transmission of light signals through the main body. The bushing and the sleeve are positioned into the main body through a forward end (e.g., an end from which the connector enters into the adaptor). The main body forms an interface at which the bushing, through which the sleeve is retained, is retained by the main body. The main body may particularly be formed as a one-piece, single, unitary, monolithic component. The main body may particularly be formed as a monolithic component in contrast to two or more components welded, bonded, fastened (e.g., via mechanical fasteners, such as, but not limited to, screws, nuts and bolts, pins, clamps, etc.), or otherwise joined together. The one-piece main body may allow for improved ruggedness, durability, and side-force resistance. The adaptor including the one-piece main body and the bushing and the sleeve provided through the forward end of the main body may eliminate a need for welding, fastening, joining, and associated inspections or treatments.

Embodiments of the adaptor and method provided herein may further include a shutter configured to selectively cover the hole formed by the bushing and sleeve. The shutter is pivotally connected to a shutter retaining clip. The shutter is slid onto the retaining clip, in contrast to being clamped or forced upon by an external component. The retaining clip, with the shutter, is positioned into the main body from an outside end, such as the forward end. A shutter spring is positioned behind the shutter and reacts against a wall within the main body to bias the shutter toward the outside end (e.g., toward the forward end). A perimeter or area of the shutter may be formed corresponding to the surrounding main body, such as to limit, mitigate, or eliminate the ingestion of particulates across the shutter. The main body may correspondingly be formed to encapsulate the shutter, such as to limit, mitigate, or eliminate the ingestion of particulates across the shutter.

Without the connector inserted or mated into the adaptor, the shutter is held at a non-orthogonal angle relative to the hole opening. When mating the connector to the adaptor, the connector forces the shutter to pivot rearward (i.e., toward the inside of the main body) and against the shutter spring. In a particular embodiment, rotation of the shutter is less than 90 degrees. The shutter spring remains compressed while the connector is held within the adaptor. Openings at the shutter spring and retaining clip may allow a recess at the shutter and the shutter spring to encapsulate within the retaining clip, which may allow the shutter spring and the shutter to pivot into a substantially flat position and prevent the recess at the shutter from inhibiting the angle of rotation of the shutter as the connector is installed into the adaptor.

Embodiments of the adaptor and method including or forming a shutter assembly such as provided herein may allow for improved dust proofing over known adaptors. The adaptor may allow for larger shutters to be retained within the main body that may allow for or improve mitigation of dust or other particulates into the main body. The shutter assembly provided in the adaptor herein may further allow for space or a gap between the shutter and lateral walls alongside the shutter when inserted into the main body. Such gap may mitigate retention of undesired particulate matter within the adaptor that may inhibit opening and closing of the shutter when the connector is mated and removed. The shutter assembly may provide improved dust and particulate proofing while mitigating stoppage, seizure, or jamming of the shutter between at the main body. Accordingly, the shutter may remain fully closed when the connector is not mated, or may spring back to fully closed when the connector is removed from the adaptor.

Figure 2:
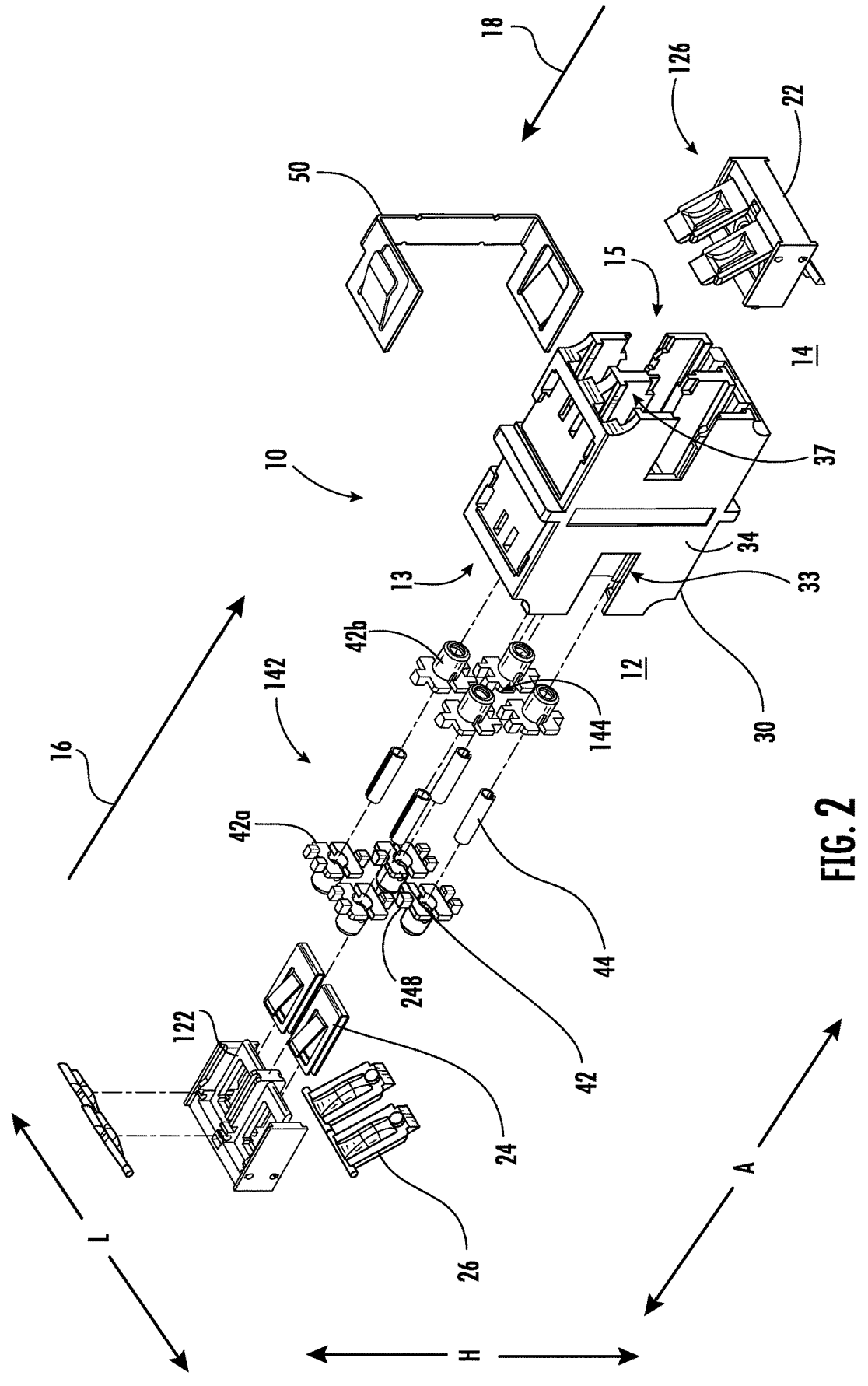
FIG. 2 is an exploded view of an embodiment of an adaptor in accordance with aspects of the present disclosure.

Referring now to the drawings, FIG. 1 is a perspective view of an exemplary embodiment of a fiber optic adaptor (hereinafter, "adaptor 10") in accordance with aspects of the present disclosure. FIG. 2 provides a perspective exploded view of an embodiment of the adaptor 10. A reference axial direction A is defined along which a connector may be inserted or removed into the adaptor 10. An inward direction 16, 18 along the axial direction A is defined from a respective outside end 12, 14 into the adaptor 10. An outward direction is defined opposite of the respective inward direction 16, 18 along the axial direction A. A forward outside end 12 (hereinafter "forward end 12") is defined and an aft outside end 14 (hereinafter, "aft end 14") is defined on an opposite side along the axial direction A from the forward end 12. A reference lateral direction L is extended perpendicular to the axial direction A. A reference height direction H is extended perpendicular to the axial direction A and the lateral direction L.

Referring now to the exploded view embodiment in FIG. 2, the adaptor 10 includes a retaining clip 22 at which a shutter spring 24 is positioned. The retaining clip 22 forms a slideable surface 122 extended along the axial direction A. The shutter spring 24 is positioned in the retaining clip 22 along the slideable surface 122. A shutter 26 is pivotally connected to the retaining clip 22. The retaining clip 22, the shutter spring 24, and the shutter 26 may together form a shutter assembly 126. In a first position corresponding to the connector not mated to the adaptor 10, the shutter 26 is held at a first angle (depicted further herein as angle 426) by the shutter spring 24 prior to insertion of the connector into the adaptor 10. When receiving the connector, the shutter 26 is rotated by the connector via the shutter spring 24 to a second angle. The first angle at which the shutter 26 is held by the shutter spring 24 is greater than 0 degrees and less than 90 degrees. The second angle corresponding to the connector installed into the adaptor 10 may be approximately or substantially flat or 0 degrees relative to the axial direction A. When the connector is mating to, and fully mated to, the adaptor 10, the rotation from the first angle to the second angle is less than 90 degrees from one another, such as illustrated further herein with regard to FIG. 9A, FIG. 9B, and FIG. 9C.

The adaptor includes a main body 30 that forms an opening 13, 15 through which one or more bushings 42, one or more sleeves 44, and the retaining clip 22 are received and positioned within the main body 30. The bushing 42 and the sleeve 44 together form a hole 46 through which the connector is insertable into the adaptor 10. The opening includes a forward opening 13 through which the connector is received from the inward direction 16 from the forward end 12. The bushing 42, the sleeve 44, and the retaining clip 22 may further be received along the inward direction 16 through the forward opening 13. The opening may further include an aft opening 15 through which the connector is received from the inward direction 18 from the aft end 14.

Figures 3, 3A, 3B:
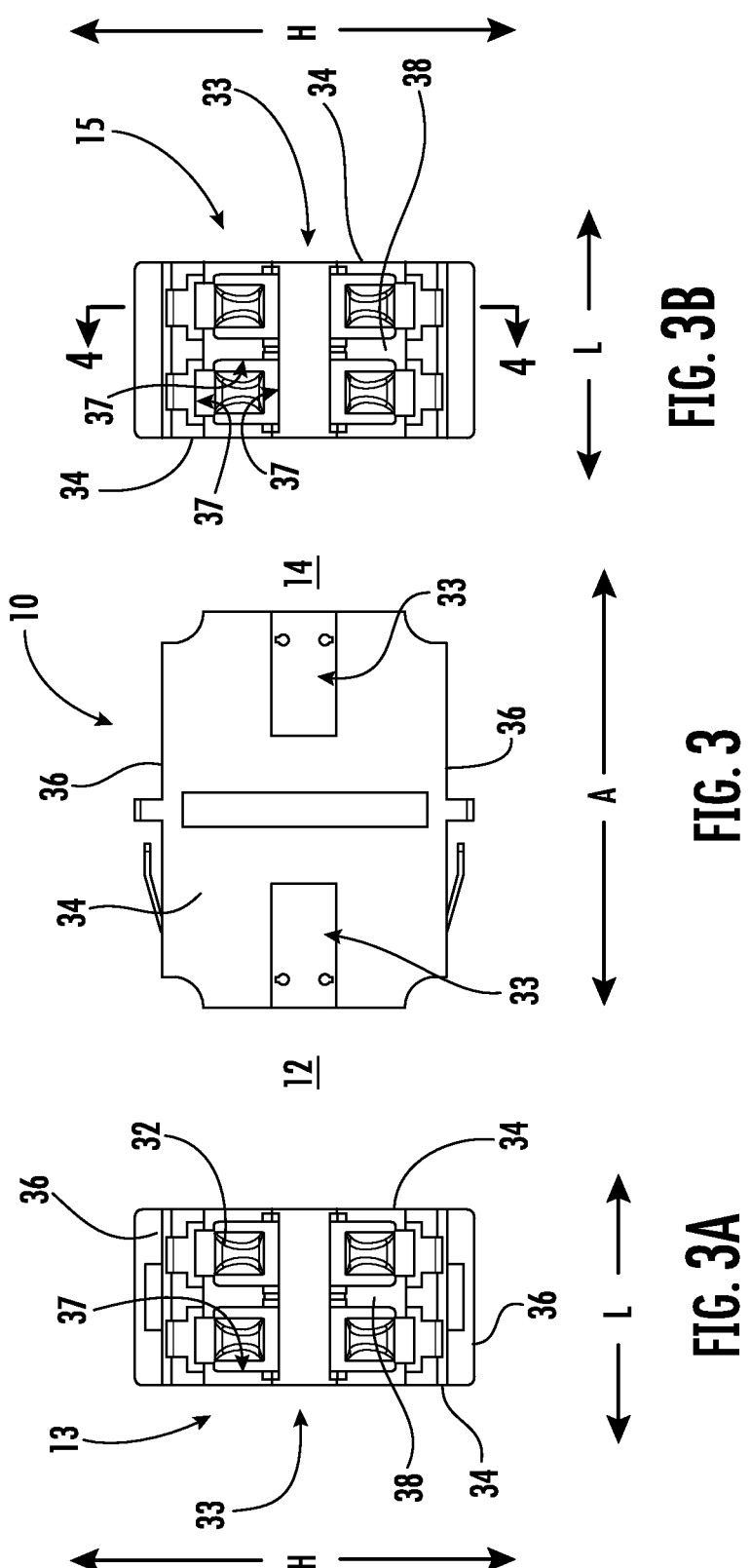
FIG. 3 is a side view of an embodiment of an embodiment of a main body of the adaptor in accordance with aspects of the present disclosure.
FIG. 3A is a view along an inward direction through a forward opening of an embodiment of the main body of FIG. 3.
FIG. 3B is a view along an inward direction through an aft opening of an embodiment of the main body of FIG. 3.

Referring to FIG. 3, a side view of an embodiment of the main body 30 is provided. FIG. 3A provides a view along the inward direction 16 through the forward opening 13. FIG. 3B provides a view along the inward direction 18 through the aft opening 15. Referring to FIG. 3, FIG. 3A, and FIG. 3B, in particular embodiments, the main body 30 is formed as a one-piece, single, unitary, monolithic component. The main body 30 may be formed by forging, casting, molding, or additive manufacturing, or other appropriate manufacturing process for generating a single, unitary, monolithic component. The main body 30 forms an interface 32 at which the bushing 42, or bushing assembly, is retained by the main body 30. In a particular embodiment, the interface 32 is formed to allow the bushing 42 to be received and retained within the main body 30 from the forward end 12, such as further described herein. In a still particular embodiment, the main body 30 forms an interior back wall 38 extended along the height direction H and the lateral direction L. The interface 32 is formed at the back wall 38 to receive and retain the bushing 42. In particular, the interface 32 may include openings substantially conforming to or outlined by the bushing 42, such as further described herein.

The main body 30 may further define a plurality of outer walls 34, 36 extended along the axial direction A. The outer walls include lateral walls 34 separated along the lateral direction L by top and bottom perimeter walls 36. The perimeter walls 36 are separated along the height direction H by the lateral walls 34. The back wall 38 is extended within the main body 30 from the lateral walls 34 and/or the perimeter walls 36.

The lateral walls 34 may form a channel 33 extended along the axial direction A for a portion of an axial dimension of the main body 30. The channel 33 is extended from the outside end 12, 14 along the inward direction. The channel 33 is formed to receive the retaining clip 22, such as further described herein. In particular, the channel 33 formed at each lateral wall 34 is formed parallel to one another relative to the lateral direction L. In certain embodiments, the main body 30 forms an aft channel extended from an aft opening at the aft end 14 in the inward direction 18. In still certain embodiment, the main body 30 forms a forward channel extended from a forward opening at the forward end 12 in the inward direction 16.

In certain embodiments, interior faces 37 within the main body 30 are formed from the perimeter walls 36 and/or lateral walls 34. The interior faces 37 form surfaces in direct contact with the shutter 26 (FIG. 2, FIG. 8, FIG. 8A-8B). In particular embodiments, the interior faces 37 are in direct contact with a perimeter or area of a wall 262 of the shutter 26 (FIG. 2, FIG. 8, FIG. 8A-8B). The interior faces 37 of the main body 30 surrounding the shutter 26 may be formed corresponding to the shutter wall 262 (FIG. 2). Additionally, or alternatively, the wall 262 of the shutter 26 (FIG. 2, FIG. 8, FIG. 8A-8B) corresponds to the interior faces 37 of the main body 30 surrounding the shutter 26. The direct contact of the interior faces 37 and the shutter 26 may encapsulate the shutter 26 and limit, mitigate, or eliminate the ingestion of particulates into the main body 30 across the shutter 26.

Figure 4:
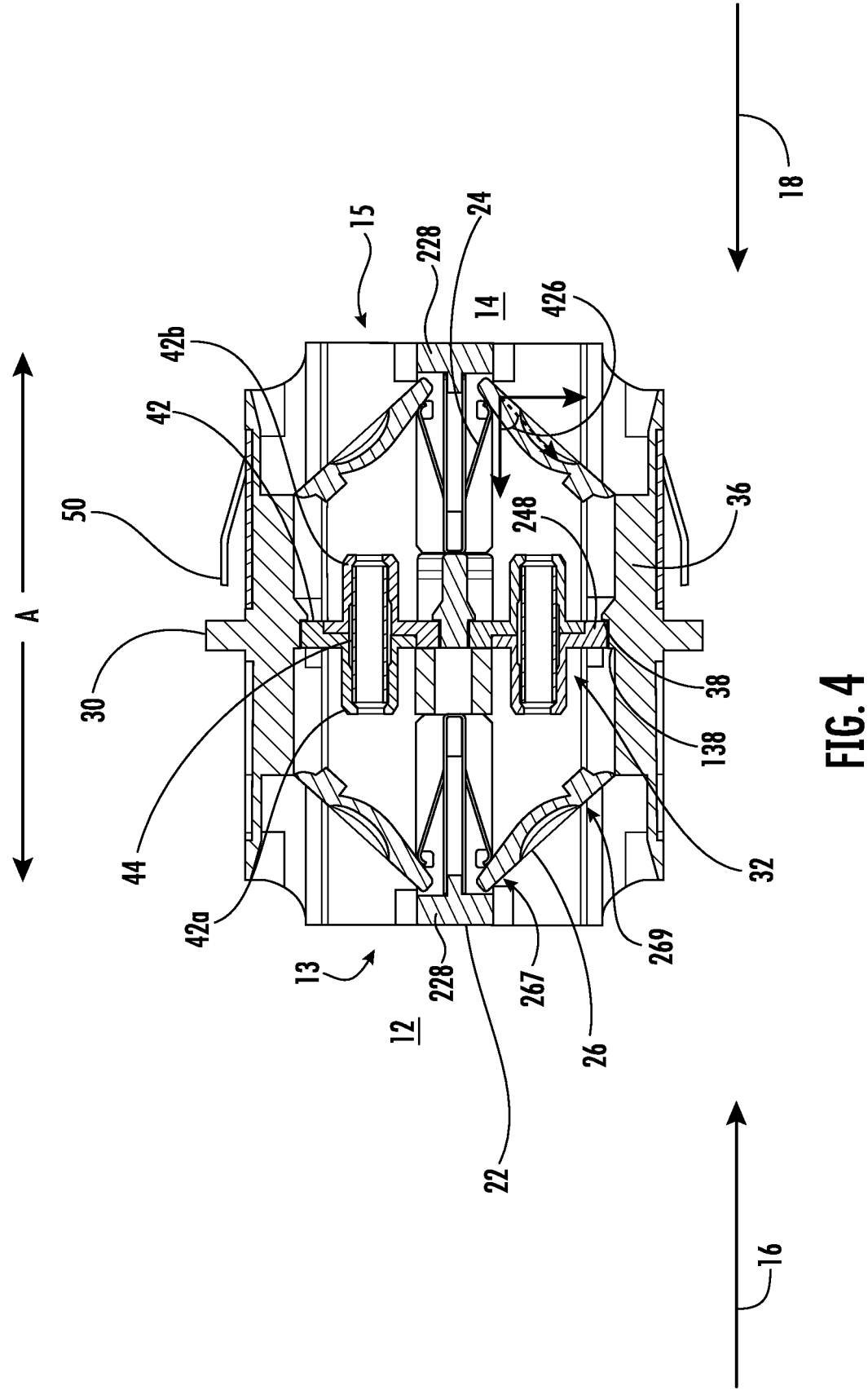
FIG. 4 is a side cross sectional view of an embodiment of the adaptor in accordance with aspects of the present disclosure.

Referring now to FIG. 4, a side cross sectional view of an embodiment of the adaptor 10 is provided. In various embodiments, such as depicted in FIG. 2 and FIG. 4, the adaptor 10 includes a plurality of bushings 42 coupled onto one or more sleeves 44. In one embodiment, such as depicted in FIG. 2, a pair of bushings 42, such as shown as bushings 42a, 42b, slides onto a single respective sleeve 44. The pair of bushings 42a, 42b is positioned adjacent to one another along the sleeve 44 along the axial direction A. The plurality of bushings 42 onto each sleeve 44 forms a bushing assembly 142. The bushing assembly 142 is forms a connector opening 144. The connector opening 144 forms a hole into which a connector may mate, such as a male connector for transmission of light signals through the main body 30. In a particular embodiment, the bushing assembly 142 includes four sleeves 44 each holding a pair of bushings 42a, 42b and arranged to form the connector opening 144. The bushings 42 may be arranged adjacent to one another along the lateral direction L and the height direction H to form the connector opening 144. The bushings 42a, 42b arranged adjacent to one another along the axial direction A may allow for receiving a first connector from the forward end 12 and a second connector from the aft end 14. Arrangements provided herein may allow for the bushing assembly 142 to be constructed and positioned through the forward end 12 of the main body 30, such as further described below. However, it should be appreciated that other embodiments may include fewer or greater quantities of bushings 42 or sleeves 44 to form the connector opening 144.

Referring to FIG. 4, the back wall 38 forms the interface 32 through which the bushing(s) 42 is received and retained into the back wall 38 of the main body 30. The interface 32 may form a press-fit, tight-fit, interference fit, or friction fit, or other appropriate type of geometric tolerance between the main body 30 and the bushing 42 to allow the bushing 42 to positioned and retained in the back wall 38. In a particular embodiment, the back wall 38 forms a detent from the outer walls 34, 36. The interface 32 may further include a fit wall 138 defining a raised surface from one or more of the outer walls 34, 36 forward of the detent formed by the back wall 38 (i.e., more proximate to the forward end 12 than the aft end 14). The fit wall 138 forms the desired fit corresponding to the bushing 42, such as prevent or inhibit movement along the lateral direction L, the height direction H, and at least partially along the axial direction A. The back wall 38 forms a stoppage that limits movement of the bushing 42 along the axial direction A and, at least in part, defines a location within the main body 30 at which the connector opening 144 is positioned.

Figures 5, 5A, 5B:
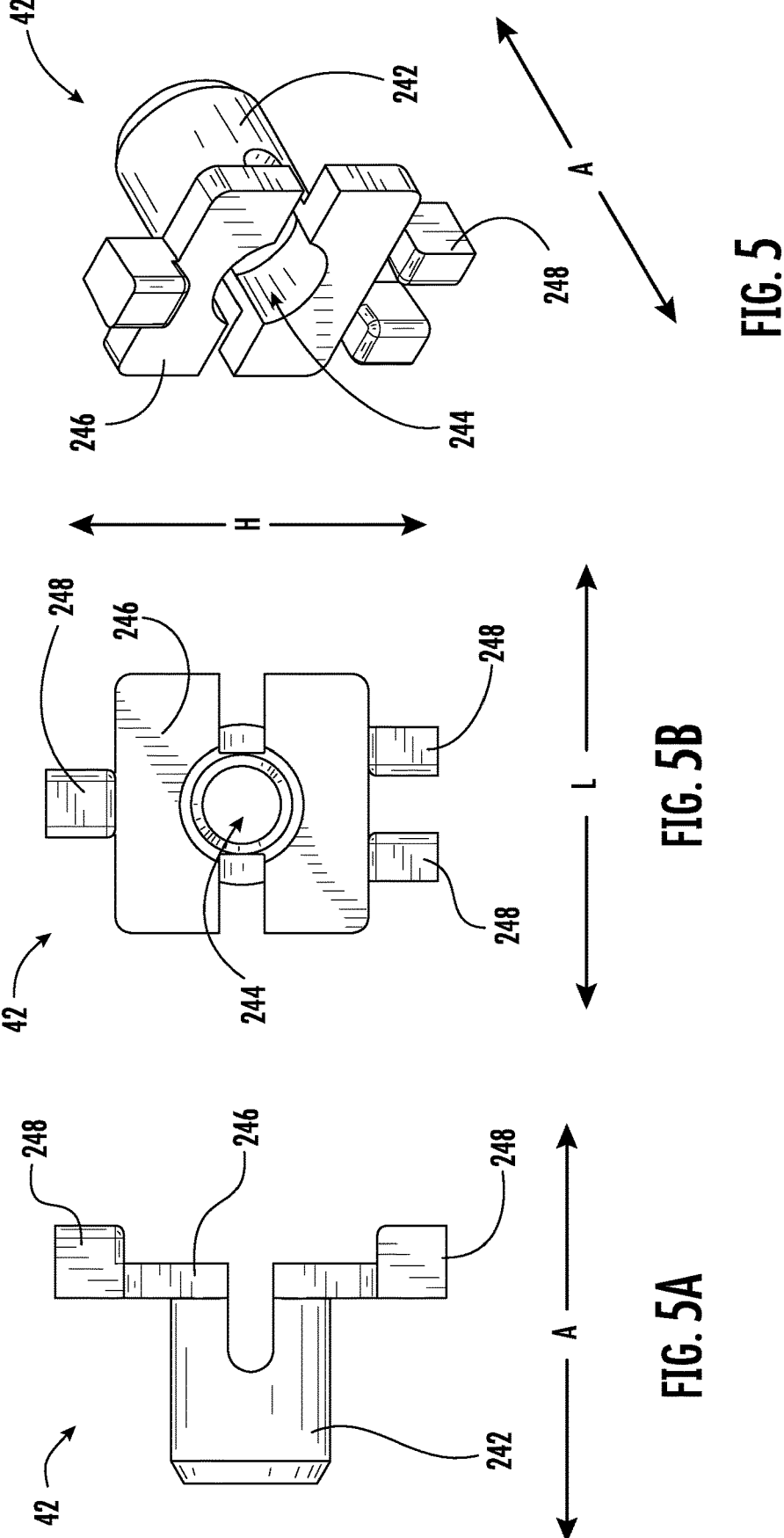
FIG. 5 is a perspective view of an embodiment of a bushing of the adaptor in accordance with aspects of the present disclosure.
FIG. 5A is a side view along an axial direction of an embodiment of the bushing of FIG. 5.
FIG. 5B is a side view along a lateral direction of an embodiment of the bushing of FIG. 5.

Referring to FIG. 5, a perspective view of an embodiment of the bushing 42 is provided. FIG. 5A provides a side view along the axial direction A of an embodiment of the bushing 42. FIG. 5B provides a side view along the lateral direction L of an embodiment of the bushing 42. Referring to FIG. 5, FIG. 5A, and FIG. 5B, in various embodiments, the bushing 42 includes a sleeve holder 242 at which the sleeve 44 (FIG. 2) is received. The sleeve holder 242 may form a cylinder that defines a sleeve opening 244 through which the sleeve 44 (FIG. 2) is received into the bushing 42. A bushing wall 246 is extended from the sleeve holder 242, such as along the height direction H and/or the lateral direction L. A plurality of tabs 248 is extended from the bushing wall 246. At least a portion of the plurality of tabs 248 is configured to extend to and mate with the main body 30. In a particular embodiment, at least a portion of the plurality of tabs 248 is extended to the interface 32 (FIG. 4), such as to mate the bushing 42 to the main body 30 (FIG. 4) as described herein. In a particular embodiment, the tab 248 may extend to the interface 32 along the height direction H and/or the lateral direction L as a corresponding fit to the interface 32, such as described herein. In a particular embodiment, at least a portion of the tabs 248 is extended from the bushing wall 246 to form the connector opening 144 at which the connector is mated to the adaptor 10. At least a portion of the tabs 248 may extend from the bushing wall 246 in accordance with a desired connector to be mated to the adaptor 10.

Figures 6, 6A:
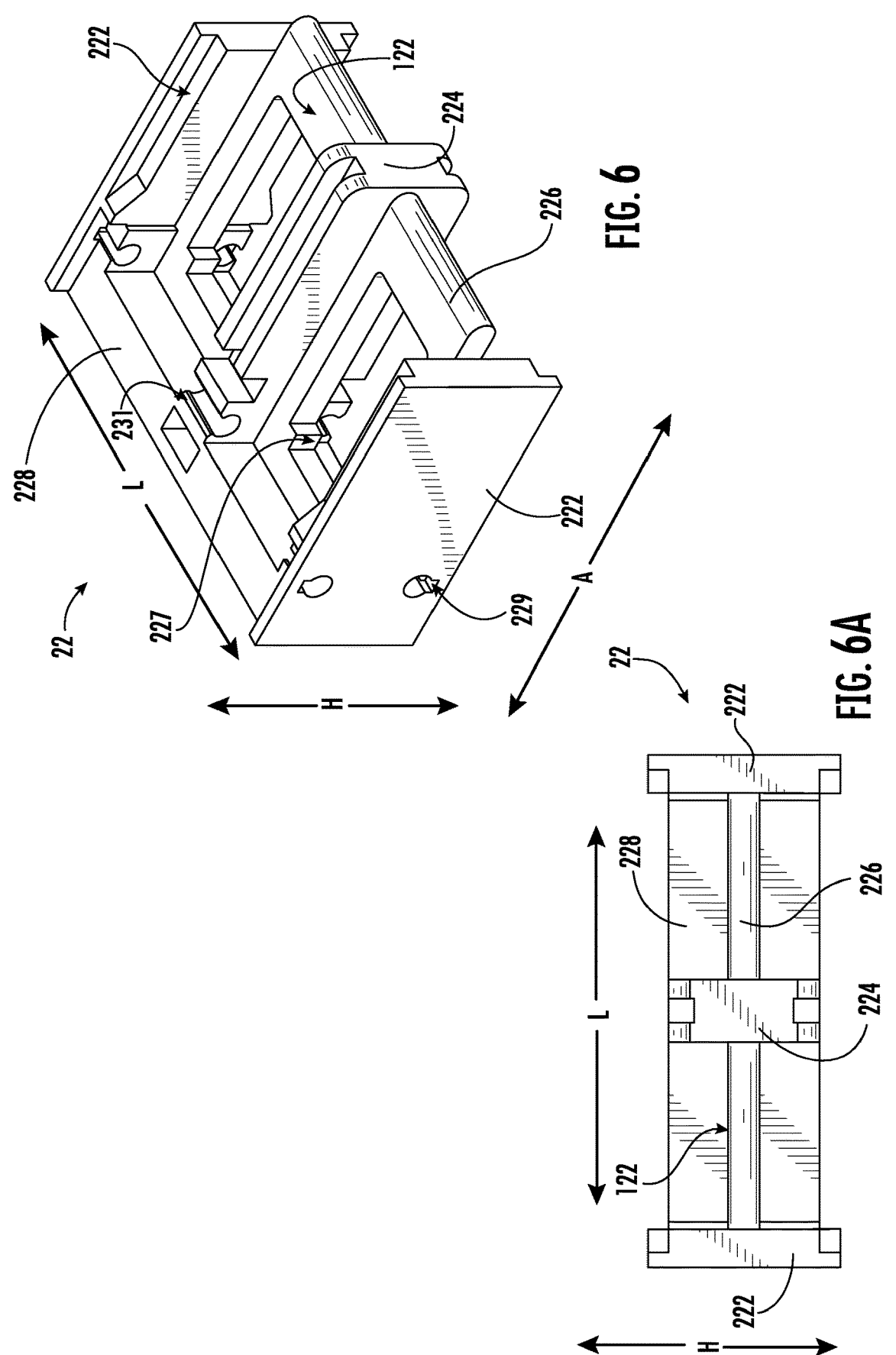
FIG. 6 is a perspective view of an embodiment of a retaining clip of the adaptor in accordance with aspects of the present disclosure.
FIG. 6A is a side view along a lateral direction of an embodiment of the retaining clip of FIG. 6.

Referring to FIG. 6, a perspective view of an embodiment of the retaining clip 22 is provided. FIG. 6A provides a side view along the lateral direction L of an embodiment of the retaining clip 22. Referring to FIG. 6 and FIG. 6A, the retaining clip 22 forms the slideable surface 122 at which the shutter spring 24 (FIG. 2) is positioned. The retaining clip 22 may include lateral walls 222 separated along the lateral direction L and extended along the axial direction A. A divider wall 224 is extended along the axial direction A and positioned along the lateral direction L between the lateral walls 22.

Figures 9A, 9B, 9C:
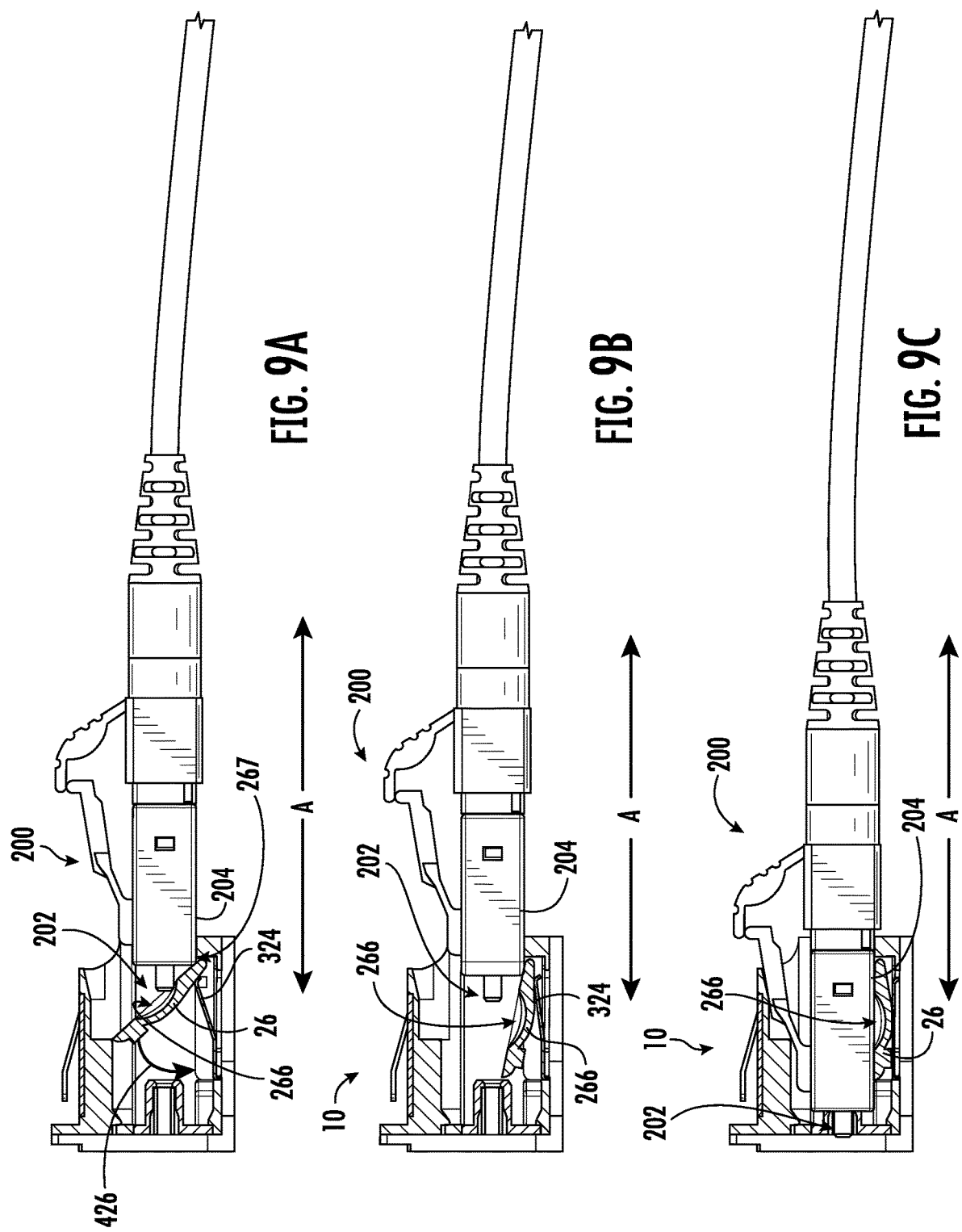
FIG. 9A is a side view of an exemplary mating of a connector to a portion of an embodiment of the adaptor in accordance with aspects of the present disclosure.
FIG. 9B is a side view of an exemplary mating of a connector to a portion of an embodiment of the adaptor in accordance with aspects of the present disclosure.
FIG. 9C is a side view of an exemplary mating of a connector to a portion of an embodiment of the adaptor in accordance with aspects of the present disclosure.

A platform 226 is extended along the lateral direction L and the axial direction A and is connected to the lateral wall 222 and the divider wall 224. A front wall 228 is extended along the lateral direction L a connects to the lateral walls 222 and the divider wall 224. The front wall 228 is extended along the height direction H. The platform 226 is formed to receive the shutter spring 24 (FIG. 2, FIG. 7), such as described herein. The platform 226 forms a platform opening 227 configured to allow a recess of the shutter 26, further described below, to enter through the platform 226. In particular, the platform opening 227 is configured to allow a spring portion 324 (FIG. 7) of the shutter spring 24 to enter into the platform 226 through the platform opening 227 to allow the shutter 26 to pivot to a substantially flat position when the connector is inserted into the adaptor 10, such as depicted in FIG. 9C.

Figures 7, 7A:
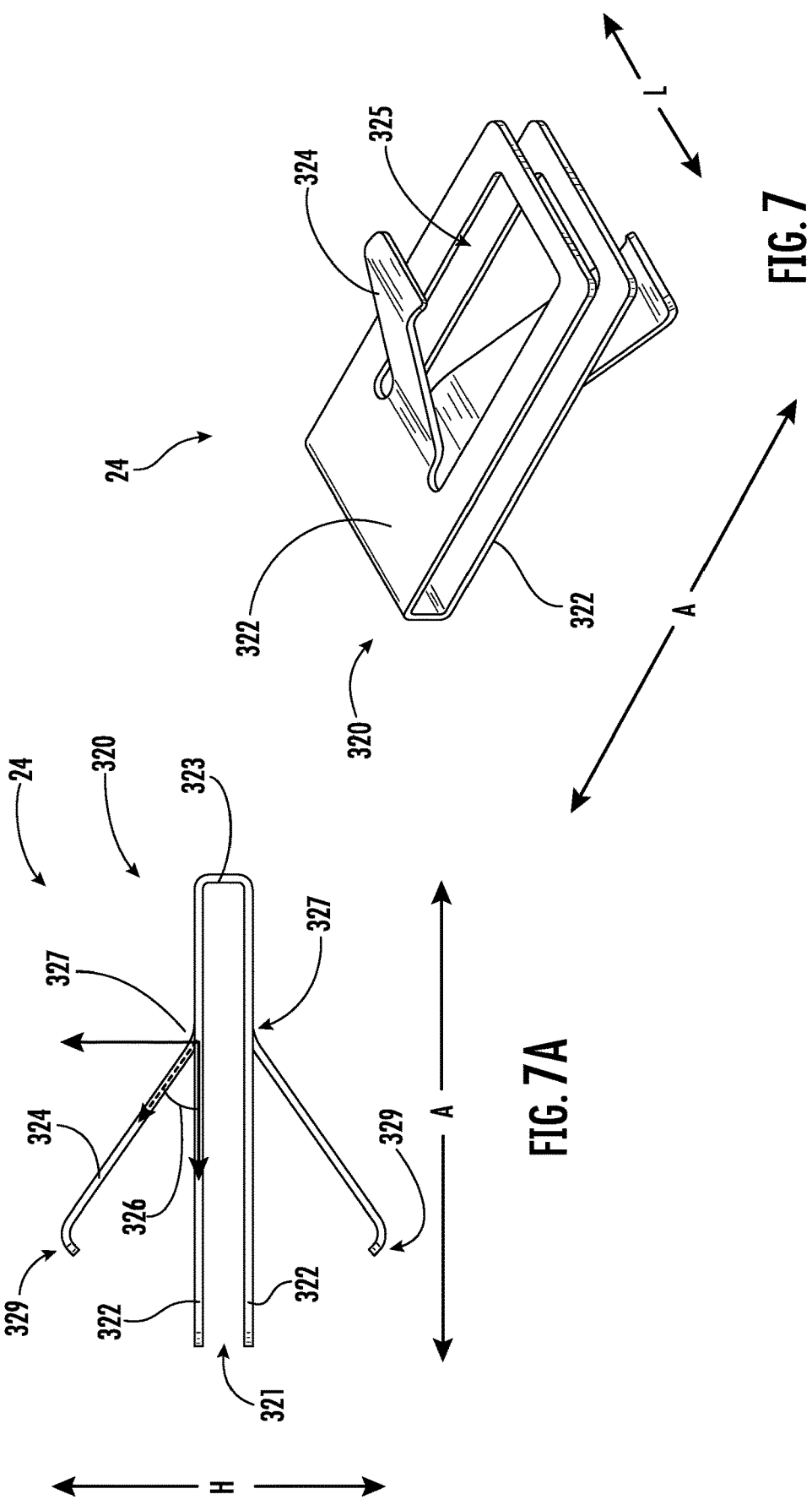
FIG. 7 is a perspective view of an embodiment of a shutter spring of the adaptor in accordance with aspects of the present disclosure.
FIG. 7A is a side view along an axial direction of an embodiment of the shutter spring of FIG. 7.

Referring briefly to FIG. 7, a perspective view of an embodiment of the shutter spring 24 is provided. FIG. 7A is a side view along the axial direction A of an embodiment of the shutter spring 24. Various embodiments of the shutter spring 24 include a clip 320 forming a clip opening 321 configured to receive the platform 226 of the retaining clip 22. The clip 320 includes a pair of walls 322 extended along the axial direction A. A connecting wall 323 is extended along the height direction H to couple the pair of walls 322 together from an inside end (i.e., an end within the adaptor 10 inward of the outside ends 14, 16). The pair of walls 322 and the connecting wall 323 together form the clip opening 321 between the pair of walls 322 along the height direction H. The shutter spring 24 may slide onto the retaining clip 22 (FIG. 6) such that the pair of walls 322 slides across the slideable surface 122 (FIG. 6) of the retaining clip 22.

Referring still to FIG. 7 and FIG. 7A, and also depicted in FIG. 4, the shutter spring 24 has a spring portion 324 extended at a first angle 326 corresponding to the connector not being inserted to the adaptor 10 or otherwise loading onto the shutter spring 24. The spring portion 324 positions the shutter 26 (FIG. 2) at the first angle 326 greater than 0 degrees and less than 90 degrees. The spring portion 324 includes a bottom end 327 at which the spring portion is connected to the wall 322. A top end 329 of the spring portion 324 is defined distal to the bottom end 327. The spring portion 324 is extended at the angle 326 from the bottom end 327 to the top end 329. Additionally, the bottom end 327 is proximate to the inside end along the axial direction A relative to the top end 329.

An opening 325 may be formed through the wall 322 corresponding substantially to the platform opening 227 (FIG. 6) at the retaining clip 22. When installing the connector 200 (FIG. 9A-9C) into the adaptor 10, the spring portion 324 of the shutter spring 24 may be encapsulated in the retaining clip 22 through the openings 325, 227. The openings 325, 227 may prevent a recess 266 formed at the shutter 26 from resting on the spring portion 324 or platform 226. The openings 325, 227 may allow the shutter 26 to pivot to substantially flat position, such as depicted in FIG. 9C.

Referring to FIG. 6 and FIG. 7 together, and further illustrated in FIG. 4, in a particular embodiment, the front wall 228 of the retaining clip 22 is extended along the height direction H corresponding to the top end 329 of the spring portion 324. Accordingly, when the retaining spring 24 is in the first angle 326 or generally unloaded by the connector, the shutter 26 is extended from the spring portion 324 in an outside direction along the height direction H (i.e., toward the perimeter wall 36). The retaining spring 24, the shutter 26, and the main body 30 together form a barrier between the outside ends 12, 14 and the connector opening 144 formed by the bushings 42. In a particular embodiment, the spring portion 324 at the top end 329 presses against the shutter 26 at or proximate to an inside end 267 of the shutter 26. The retaining spring 24 positions the shutter 26 at an acute angle extended from an inside end 267 of the shutter to an outside end 269 of the shutter 26. The barrier may accordingly mitigate dust or other particulates from entering the adaptor 10.

Figures 8, 8A, 8B:
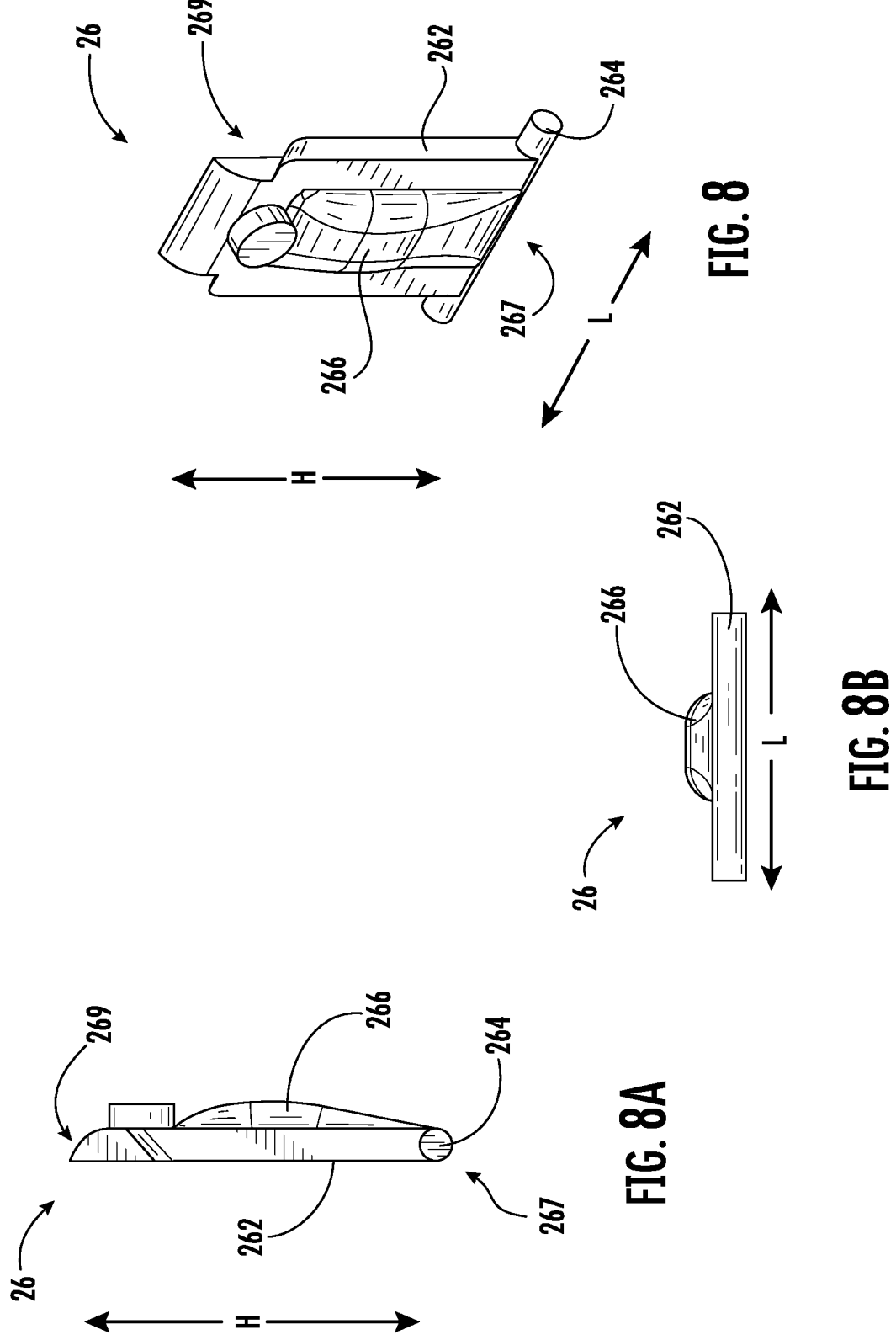
FIG. 8 is a perspective view of an embodiment of a shutter of the adaptor in accordance with aspects of the present disclosure.
FIG. 8A is a side view along an axial direction of an embodiment of the shutter of FIG. 8.
FIG. 8B is a side view along a lateral direction of an embodiment of the shutter of FIG. 8.

Referring now to FIG. 8, a perspective view of an embodiment of the shutter 26 is provided. FIG. 8A provides a side view along the axial direction A of an embodiment of the shutter 26. FIG. 8B provides a side view along the lateral direction L of an embodiment of the shutter 26. Referring to FIG. 8, FIG. 8A, and FIG. 8B, the shutter 26 forms a wall 262 that forms a barrier between the outside ends 12, 14 of the adaptor 10 and the connector opening 144 (FIG. 2). A perimeter or area of the wall 262 may be formed corresponding to the surrounding main body 30. In particular embodiments, the wall 262 of the shutter 26 corresponds to the interior faces 37 (FIG. 2, FIG. 3, FIGS. 3A-3B) of the main body 30. The wall 262 formed accordingly may limit, mitigate, or eliminate the ingestion of particulates across the shutter 26. The interior faces 37 of the main body 30 (FIG. 2, FIG. 3, FIGS. 3A-3B) may correspondingly be formed to encapsulate the shutter wall 262, such as to limit, mitigate, or eliminate the ingestion of particulates across the shutter 26.

A pin 264 is extended along the lateral direction L. In a particular embodiment, the pin 264 forms a cylindrical structure configured to insert into a pin opening 229 (FIG. 6) extended along the lateral direction L into the lateral wall 222 of the retaining clip 22. Another pin 264 is extended from the shutter 26, or particularly the wall 262, to a channel 231 (FIG. 6) formed at the divider wall 224. The channel 231 is extended along the lateral direction L. In a particular embodiment, the channel 231 is an open faced slot configured to allow the pin 264 to engage along the height direction H into the channel 231. The channel 231 may further allow the shutter 26 to slide into the pin opening 229 along the lateral direction L to allow for the pins 264 to pivotally engage the retaining clip 22.

Referring now to FIG. 9A, FIG. 9B, and FIG. 9C, views of insertion of a connector 200 into an embodiment of the adaptor 10 are provided. Referring also to FIG. 8, FIG. 8A, and FIG. 8B, the wall 262 of the shutter 26 may form a recess 266 configured to receive a terminal end portion 202 (FIG. 9A, FIG. 9B, FIG. 9C) of the connector 200 such that a surrounding non-terminal body portion 204 of the connector 200 engages the shutter 26 prior to the terminal end portion 202 engaging the shutter 26. Referring to FIG. 9A, the body portion 204 of the connector 200, such as a portion proximate to the inside end 267 of the shutter 26, is allowed to contact the shutter 26 prior to the terminal end portion 202 (e.g., a ferrule) of the connector 200. In a particular embodiment, the body portion 204 of the connector 200 proximate to a pivot axis at the pin 264 of the shutter 26 and the opening 229 at the retaining clip 22 is allowed to contact the shutter 26 prior to the terminal end portion 202 of the connector 200.

Referring to FIG. 9B and FIG. 9C, the recess 266 and an angle 426 at which the shutter 26 is held prior to insertion are configured to allow the body portion 204 of the connector 200 to engage the shutter 26 prior to the terminal end portion 202 engaging the shutter 26. Additionally, the recess 266 and the angle 426 at which the shutter 26 is held prior to insertion are configured to prevent the terminal end portion 202 of the connector 200 to from engaging shutter 26 prior to the body portion 204 engaging the shutter 26. A particular benefit of the recess 266 and the angle 426 of the shutter 26 may allow the recess 266 to not necessarily be defined at a depth that is greater than the exposed terminal end 202 of the connector 200. Stated differently, the recess 266 may form a protrusion that less than a dimension of the terminal end 202 along the axial direction A. As the shutter 26 rotates (such as depicted in FIG. 9B and FIG. 9C) to an approximately or substantially flat position or 90 degree position, such as depicted in FIG. 9C, the recess 266 may be received within a volume corresponding to the extension of the lateral wall 222 (FIG. 6) from the platform 226 along the height direction H. The volume, or particularly the extension of the lateral wall 222 along the height direction H, may accordingly be reduced with a less-protruding recess 266. The reduced dimension may further allow for positioning of one or more embodiments of the shutter 26, the shutter spring 24, or the retaining clip 22 such as provided herein. Additionally, or alternatively, the reduced dimension may further allow for a unitary, one-piece main body 30 to receive the shutter assembly 126 (FIG. 2).

Referring back to FIG. 2, the adaptor 10 may include a first shutter assembly configured to enter the main body 30 from the forward end 12 and a second shutter assembly configured to enter the main body 30 from the aft end 14. The first shutter assembly 126 and the bushing assembly 142 are in serial positioning in the main body 30 along the axial direction A from the forward end 12. The second shutter assembly 126 is positioned aft of the bushing assembly 142 along the axial direction A from the aft end 14.

Referring now to FIG. 10, a flowchart outlining steps of a method for mating a fiber optic connector to an adaptor is provided (hereinafter, "method 1000"). Steps of the method 1000 provided herein may additionally, or alternatively, form a method for forming an adaptor for a fiber optic connector. The method 1000 may be performed with one or more embodiments of the adaptor 10 provided herein. However, it should be appreciated that the method 1000 may be applied to other adaptors.

The method 1000 includes at 1010 connecting the bushing and the sleeve to the main body. In a particular embodiment, the method 1000 at 1010 includes connecting the bushing and the sleeve into the main body through a forward end of the main body along an inward direction.

The method 1000 at 1020 includes sliding the shutter spring into the retaining clip. The method 1000 at 1020 may particularly provide for sliding the shutter spring into the retaining clip rather than clamping or utilizing a component other than the retaining clip to retain the shutter spring. In a particular embodiment, sliding and retaining the shutter spring into the retaining clip includes sliding the shutter spring from the forward end along the inward direction into the main body.

The method 1000 at 1030 includes connecting the shutter to the shutter spring and biasing the shutter in the outward direction via the shutter spring positioned within the main body. The shutter spring is held in a non-orthogonal angle prior to insertion of the connector. The non-orthogonal angle is greater than zero degrees and less than 90 degrees.

The method 1000 at 1040 includes inserting the retaining clip including the shutter and the shutter spring into the main body along the inward direction. The method 1000 at 1040 may contrast with inserting the retaining clip into the main body through a center portion, or welding or bonding the retaining clip to the main body.

In various embodiments, the method 1000 includes at 1050 inserting the connector into the adaptor. In a particular embodiment, the method 1000 includes at 1060 pivoting the shutter in the inward direction against the shutter spring when inserting the connector to the adaptor. In particular embodiments, pivoting the shutter in the inward direction comprises rotating the shutter by less than 90 degrees and greater than zero degrees.

In a particular embodiment, the method 1000 includes at 1070 forming a recess within the shutter. The method 1000 may include at 1080 engaging a body portion of the connector to the shutter prior to a terminal end portion, such as ferrule, of the connector when mating the connector to the main body. In a particular embodiment, engaging the body portion of the connector includes engaging the connector to the bottom end of the shutter prior to engaging the terminal end portion of the connector. In a still particular embodiment, the recess formed within the shutter prevents the terminal end portion of the connector from engaging the shutter prior to the body portion of the connector. Additionally, or alternatively, the recess formed within the shutter allows the body portion of the connector to engage the shutter prior to the terminal end portion of the connector.

Embodiments of the adaptor 10 and method 1000 provided herein allow for mitigating dust and particulate ingestion into the main body. The adaptor 10 may include fewer components than known adaptors, allowing for simpler assembly and reduced costs.

Further aspects of the invention are provided by one or more of the following embodiments:

1. A method for mating a fiber optic connector to an adaptor, wherein the adaptor includes a bushing, a sleeve, a main body, a shutter, a pair of pins, a retaining clip, and a shutter spring, and wherein a forward end is defined from which a connector is received into the main body and an inward direction is defined toward which the connector is extended into the main body, the method includes connecting the bushing and the sleeve to the main body; sliding the shutter spring into the retaining clip; connecting the shutter to the shutter spring and biasing the shutter in the forward direction via the shutter spring positioned within the main body, wherein the shutter spring is held in a non-orthogonal angle prior to insertion of the connector; and inserting the retaining clip including the shutter and the shutter spring into the main body along the inward direction.

2. The method of any one or more clauses herein, the method including inserting the connector into the adaptor.

3. The method of any one or more clauses herein, the method including pivoting the shutter in the inward direction against the shutter spring when inserting the connector to the adaptor.

4. The method of any one or more clauses herein, wherein pivoting the shutter in the inward direction includes rotating the shutter by less than 90 degrees and greater than zero degrees.

5. The method of any one or more clauses herein, the method including forming a recess within the shutter.

6. The method of any one or more clauses herein, the method including engaging a body portion of the connector to the shutter prior to a terminal end portion of the connector when mating the connector to the main body.

7. The method of any one or more clauses herein, wherein engaging the body portion of the connector includes engaging the connector to the bottom end of the shutter prior to engaging the terminal end portion of the connector.

8. The method of any one or more clauses herein, wherein the recess formed within the shutter prevents the terminal end portion of the connector from engaging the shutter prior to the body portion of the connector.

9. The method of any one or more clauses herein, wherein connecting the bushing and the sleeve to the main body includes connecting the bushing and the sleeve to the main body from the forward end along the inward direction.

10. The method of any one or more clauses herein, wherein sliding the shutter spring into the retaining clip includes sliding the shutter spring from the forward end along the inward direction.

11. An adaptor, wherein an axial direction is defined along which a connector is received into the adaptor, and wherein a forward end is defined from which the connector is received into the adaptor, wherein an inward direction is defined along the axial direction toward which the connector is extended into the adaptor, and wherein an outward direction is defined opposite of the inward direction along the axial direction, the adaptor including a retaining clip including a slideable surface extended along the axial direction, wherein a shutter spring is positioned in the retaining clip along the slideable surface, and wherein a shutter is pivotally connected to the retaining clip from a first angle prior to insertion of the connector into the adaptor to a second angle after receiving the connector into the adaptor, wherein the first angle is greater than 0 degrees and less than 90 degrees; a main body, wherein the main body forms an opening through which the retaining clip is received and positioned within the main body along the inward direction from the forward end; a bushing; and a sleeve, wherein the bushing and the sleeve form a hole through which the connector is insertable into the adaptor.

12. The adaptor of any one or more clauses herein, wherein the main body includes a back wall at which the shutter spring biases the shutter toward the outward direction from which the connector is received.

13. The adaptor of any one or more clauses herein, wherein the shutter includes a recess extended in the inward direction, wherein the recess is positioned to receive a terminal end portion of the connector.

14. The adaptor of any one or more clauses herein, wherein the shutter includes a bottom end positioned proximate to the opening formed at the main body relative to a top end disposed distal to the opening.

15. The adaptor of any one or more clauses herein, wherein the shutter includes a pair of pins extended along a lateral direction to the retaining clip.

16. The adaptor of any one or more clauses herein, wherein the main body is a unitary, monolithic component.

17. The adaptor of any one or more clauses herein, wherein the main body forms a channel extended from the opening, wherein the channel is configured to receive the retaining clip from the forward end of the adaptor.

18. The adaptor of any one or more clauses herein, wherein the main body forms an aft channel extended from an aft opening formed at an aft end of the main body, wherein the aft channel is configured to receive a second retaining clip from the aft end of the adaptor.

19. The adaptor of any one or more clauses herein, wherein the bushing includes a first bushing positioned at a first end of the sleeve and a second bushing positioned at a second end of the sleeve opposite of the first bushing along the axial direction.

20. The adaptor of any one or more clauses herein, wherein the adaptor includes a first shutter assembly comprising the retaining clip, the shutter, and the shutter spring, wherein the first shutter assembly is received and positioned within the main body along the inward direction through the opening from the forward end of the main body; a second shutter assembly comprising the retaining clip, the shutter, and the shutter spring, wherein the second shutter assembly is received and positioned within the main body along the inward direction through an aft opening from an aft end of the main body; a bushing assembly comprising the sleeve coupling a plurality of bushings, wherein the first shutter assembly and the bushing assembly are in serial positioning in the main body along the axial direction from the forward end, and wherein the second shutter assembly is positioned aft of the bushing assembly along the axial direction from the aft end.

21. The adaptor of any one or more clauses herein, wherein a perimeter of the shutter corresponds to the main body surrounding the shutter.

22. The adaptor of any one or more clauses herein, wherein the retaining clip and the shutter spring each form an opening allowing the recess of the shutter into the opening.

23. The method of any one or more clauses herein including the adaptor of any one or more clauses herein.

24. A method for forming an adaptor for a fiber optic connector, the method including any one or more steps of the method of any one or more clauses herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An adaptor, wherein an axial direction is defined along which a connector is received into the adaptor, and wherein a forward end is defined from which the connector is received into the adaptor, wherein an inward direction is defined along the axial direction toward which the connector is extended into the adaptor, and wherein an outward direction is defined opposite of the inward direction along the axial direction, the adaptor comprising:

a first shutter assembly and a second shutter assembly each comprising a retaining clip, a shutter, and a shutter spring, wherein the retaining clip comprises a slideable surface extending along the axial direction, and wherein the shutter spring is positioned in the retaining clip along the slideable surface, the shutter pivotally connected to the retaining clip from a first angle to a second angle, wherein the first angle is prior to insertion of the connector into the adaptor, and wherein the second angle is after receiving the connector, the first angle greater than zero degrees and less than 90 degrees;

a main body, wherein the main body forms a unitary, monolithic component comprising a forward opening and an aft opening, wherein the retaining clip of the first shutter assembly is received through the forward opening along the inward direction and wherein the retaining clip of the second shutter assembly is received through the aft opening along the inward direction; and a bushing assembly comprising a pair of bushings received at a sleeve, wherein the main body comprises a back wall at which an interface is positioned at which the bushing assembly is received in the main body through the forward opening, wherein the first shutter assembly is received and positioned within the main body along the inward direction through the opening from the forward end of the main body, and wherein the second shutter assembly is received and positioned within the main body along the inward direction through an aft opening from an aft end of the main body;

wherein the first shutter assembly and the bushing assembly are in serial positioning in the main body along the axial direction from the forward end, and wherein the second shutter assembly is positioned aft of the bushing assembly along the axial direction from the aft end, and wherein the back wall at which the bushing assembly is received is positioned between the first shutter assembly and the second shutter assembly.

2. The adaptor of claim 1, wherein the main body comprises a wall at which the shutter spring biases the shutter toward the outward direction from which the connector is received.

3. The adaptor of claim 1, wherein the shutter comprises:

a recess extended in the inward direction, wherein the recess is positioned to receive a terminal end portion of the connector.

4. The adaptor of claim 3, wherein the retaining clip and the shutter spring each form an opening allowing the recess of the shutter into the opening.

5. The adaptor of claim 1, wherein the shutter comprises:

a bottom end positioned proximate to the opening formed at the main body relative to a top end disposed distal to the opening.

6. The adaptor of claim 5, wherein the shutter comprises: a pair of pins extended along a lateral direction to the retaining clip.

7. The adaptor of claim 1, wherein the main body forms a channel extended from the forward opening and from the aft opening, wherein the channel is configured to receive the retaining clip of the first shutter assembly from the forward end of the adaptor, and wherein the channel is configured to receive the retaining clip of the second shutter assembly from the aft end of the adaptor.

8. The adaptor of claim 1, wherein a perimeter of the shutter corresponds to interior faces of the main body surrounding the shutter.

9. A method for mating a fiber optic connector to an adapter, the method comprising:

connecting, along an inward direction toward which the connector is extended into a main body, a pair of bushings and a sleeve to a back wall of the main body at which an interface is positioned at which a bushing assembly of the pair of bushings and the sleeve is received through the main body through a forward opening from which the connector is received into the main body, wherein the main body forms a unitary, monolithic component comprising the forward opening and an aft opening, sliding, along an axial direction along which the connector is received into the adaptor, a shutter spring along a slideable surface of a retaining clip;

connecting a shutter to the shutter spring at the retaining clip, the shutter pivotally connected to the retaining clip from a first angle to a second angle, wherein the first angle is prior to insertion of the connector into the adaptor, and wherein the second angle is after receiving the connector, the first angle greater than zero degrees and less than 90 degrees;

inserting the retaining clip of a first shutter assembly and a second shutter assembly each comprising the shutter and the shutter spring into the main body respectively through the forward opening and the aft opening along the inward direction, wherein the first shutter assembly is received and positioned within the main body along the inward direction through the opening from the forward end of the main body, and wherein the second shutter assembly is received and positioned within the main body along the inward direction through an aft opening from an aft end of the main body, and wherein the first shutter assembly and the bushing assembly are in serial positioning in the main body along the axial direction from the forward end, and wherein the second shutter assembly is positioned aft of the bushing assembly along the axial direction from the aft end, and wherein the back wall at which the bushing assembly is received is positioned between the first shutter assembly and the second shutter assembly.

10. The method of claim 9, the method comprising:
inserting the connector into the adaptor.

11. The method of claim 10, the method comprising:
pivoting the shutter in the inward direction against the shutter spring when inserting the connector to the adaptor.

12. The method of claim 11, wherein pivoting the shutter in the inward direction comprises rotating the shutter by less than 90 degrees and greater than zero degrees.

13. The method of claim 9, the method comprising:
forming a recess within the shutter.

14. The method of claim 13, the method comprising:
engaging a body portion of the connector to the shutter prior to a terminal end portion of the connector when mating the connector to the main body.

15. The method of claim 14, wherein engaging the body portion of the connector comprises engaging the connector to the bottom end of the shutter prior to engaging the terminal end portion of the connector.

16. The method of claim 14, wherein the recess formed within the shutter prevents the terminal end portion of the connector from engaging the shutter prior to the body portion of the connector.

\*    \*    \*    \*    \*